United States Patent
Henrick et al.

(10) Patent No.: US 12,040,552 B2
(45) Date of Patent: Jul. 16, 2024

(54) PHASED ARRAY ANTENNA WITH REDUCED NODE COUNT

(71) Applicant: The Johns Hopkins University, Baltimore, MD (US)

(72) Inventors: Robert F. Henrick, Highland, MD (US); Jean M. Dougherty, Highland, MD (US); George S. Peacock, West Hills, CA (US)

(73) Assignee: The Johns Hopkins University, Baltimore, MD (US)

( * ) Notice: Subject to any disclaimer, the term of this patent is extended or adjusted under 35 U.S.C. 154(b) by 1 day.

(21) Appl. No.: 17/582,240

(22) Filed: Jan. 24, 2022

(65) Prior Publication Data
US 2022/0399641 A1  Dec. 15, 2022

Related U.S. Application Data

(60) Provisional application No. 63/147,293, filed on Feb. 9, 2021.

(51) Int. Cl.
*H01Q 3/26*  (2006.01)

(52) U.S. Cl.
CPC ............. *H01Q 3/2658* (2013.01); *H01Q 3/26* (2013.01); *H01Q 3/267* (2013.01)

(58) Field of Classification Search
CPC ........ H01Q 3/2658; H01Q 3/26; H01Q 3/267; H04B 7/0608; H04B 7/0617
See application file for complete search history.

(56) References Cited

U.S. PATENT DOCUMENTS

| 9,559,417 | B1 * | 1/2017 | Schwarzwalder | ... H01Q 3/2605 |
| 2006/0114148 | A1 * | 6/2006 | Pillai | ......................... H01Q 3/30 342/174 |
| 2019/0253125 | A1 * | 8/2019 | Apaydin | ................. H01Q 21/22 |
| 2020/0052755 | A1 * | 2/2020 | Hwang | ................. H04B 7/0695 |
| 2021/0050667 | A1 * | 2/2021 | Ray | ....................... H04B 7/0617 |

FOREIGN PATENT DOCUMENTS

CN          114730000 A  *  7/2022

\* cited by examiner

*Primary Examiner* — Hoang V Nguyen
*Assistant Examiner* — Yonchan J Kim
(74) *Attorney, Agent, or Firm* — Sung Kim

(57) ABSTRACT

A computer-implemented method includes receiving a set of constraints for an antenna having nodes of a phased array for receiving and/or transmitting a radiation signal, including a shape and size of the antenna, a frequency range for the radiation signal, and a view sector. The method includes receiving a set of thresholds including a threshold for a beam width of a central beam of the radiation signal and a threshold for interference associated with radiation outside of the central beam of the radiation signal. The method includes determining a first set of locations of the nodes based on the set of constraints and thresholds, determining an adjustment for the first set of locations in accordance with the set of thresholds, and determining a final set of locations of the nodes based on the adjustment to minimize a node count and achieving an optimized operation of the antenna.

18 Claims, 7 Drawing Sheets

PHASED ARRAY ANTENNA WITH REDUCED NODE COUNT

CROSS REFERENCE TO RELATED APPLICATIONS

This application claims benefit to U.S. Provisional Patent Application No. 63/147,293, filed on Feb. 9, 2021, which is incorporated by reference herein in its entirety.

BACKGROUND

Field

The present disclosure relates to phased array antennas, for example, Radio Frequency (RF), optical and acoustic receiving and transmitting arrays.

Background

Phased array antennas are used in the fields of acoustic, Radio Frequency (RF) and more recently optical domains due to their ability to steer and form multiple beams in a given viewing or transmitting space. Phased arrays are utilized in multiple applications, including but not limited to audio, communications, electronic intelligence, imaging, radar and sonars. In these applications, radiation signals have bandwidth relative to the center frequency, with the higher frequencies being fractions to many multiples of the center frequency.

Cost and complexity of phased arrays are driven by, for example, the antenna size, aperture size, number of nodes, or the like. The broadband nature of phased arrays and a market demand for good interference rejection significantly increases the node count. For example, using nodes at a fixed separation with node spacings set at the highest frequency produces very large node counts. Using denser nodes inserted in the interior of each subarray (e.g., linear nesting) may reduce node count somewhat, but with the drawback of changing the aperture over the frequencies of each subarray, and the amount of node count reduction may still be unsatisfactory.

SUMMARY

Accordingly, it is desirable to improve devices and functions of phased arrays to reduce cost and complexity while still delivering performance that meets industry standards.

In some embodiments, a computer-implemented method is used to minimize a node count of an antenna. The method comprises receiving a set of constraints for the antenna. The antenna comprises nodes of a phased array for receiving, transmitting, or receiving and transmitting a radiation signal. The set of constraints comprises a shape and size of the antenna, a frequency range for the radiation signal, and a view sector. The method further comprises receiving a set of thresholds corresponding to a performance of the antenna. The set of thresholds comprises a threshold for a beam width of a central beam of the radiation signal and a threshold for interference associated with radiation outside of the central beam of the radiation signal. The method further comprises determining a first set of locations of the nodes based on the set of constraints and thresholds. The method further comprises determining an adjustment for the first set of locations in accordance with the set of thresholds. The method further comprises determining a final set of locations of the nodes based on the adjustment to minimize the node count, whereby an optimized operation of the antenna is achieved with the final set of locations of the nodes.

In some embodiments, an antenna comprises a phased array. The phased array comprises nodes is configured to receive, transmit, or receive and transmit a radiation signal. The radiation signal comprises a central broadside beam, a frequency range, and a resolution associated with specified beam widths of the central broadside beam over the frequency range. The phased array further comprises a non-linear spacing section, wherein at least first, second, and third ones of the nodes disposed at the non-linear spacing section have a node-to-node spacing that is non-constant. A disposition of the nodes on the antenna is associated with a minimum total node count of the phased array that is a minimum for a given resolution associated with beam width of the central broadside beam and a given level of interference rejection associated with radiation outside of the central broadside beam over the frequency range and view sector.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

Figure 1:
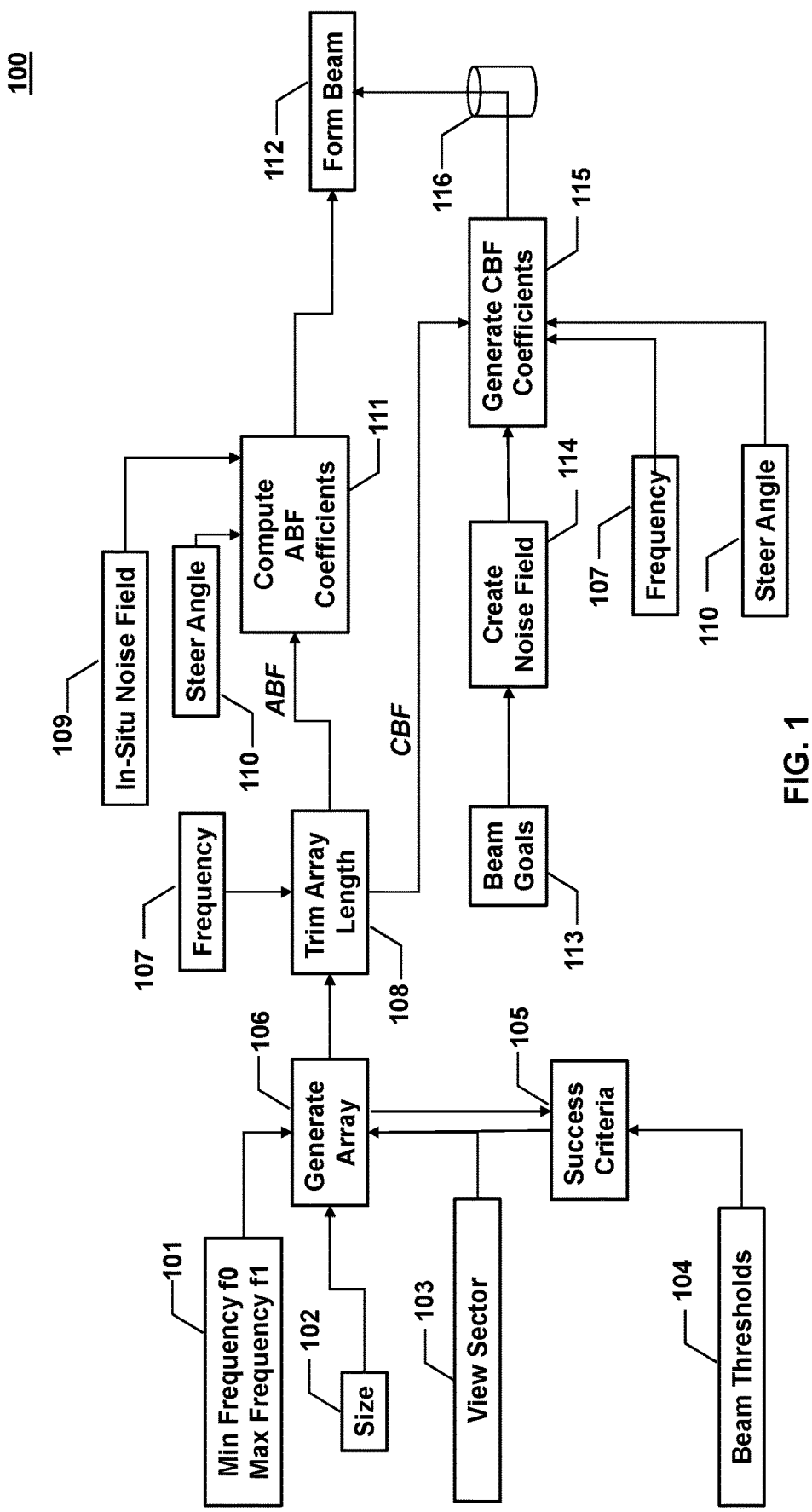
FIG. 1 shows a flowchart for a method of generating and processing a phased array antenna that meets array constraints and design thresholds, according to some embodiments.

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The term "about," "approximately," or the like may be used herein to indicate a value of a quantity that may vary or be found to be within a range of values, based on a particular technology. Based on the particular technology, the terms may indicate a value of a given quantity that is within, for example, 1-20% of the value (e.g., ±1%, ±5%±10%, ±15%, or ±20% of the value).

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, it should be appreciated that such descriptions are merely for convenience and that such actions in fact result from computing devices, processors, controllers, or other devices executing the firmware, software, routines, instructions, etc. In the context of computer storage media, the term "non-transitory" may be used herein to describe all forms of computer readable media, with the sole exception being a transitory, propagating signal.

In some embodiments, designing a phased array antenna may be performed using a computing device. The computing device may compute the performance of hundreds or more permutations of a reference antenna design. In some embodiments, the terms "phased array antenna" and "phased array" may be used interchangeably. In some embodiments, in the context of computer design of a phased array, the term "processing" (e.g., as in processing a phased array) may be used herein to refer to optimizations of a phased array designs. For example, processing a phased array may include iteratively altering positions of phased array nodes and computing the resulting changes to the radiation signal received and/or transmitted by the phased array. Furthermore, in some embodiments, in the context of computer design of a phased array, the term "goal" may refer to a threshold the computer routine is to abide by (e.g., a threshold value that should not be exceeded, or a threshold value that when exceeded stops the computer routine).

A phased array is designed for specific use and utility. The design process starts with a series of constraints. In some embodiments, these constraints include the size allocated for the array, the frequency range over which the array is to operate and the view sector wherein beams will be formed (e.g., seismic exploration looking straight down, segmented phased arrays such as the AEGIS multi face SPY-1 radar searching a sector, communications satellites looking toward the Earth, or the like). In some embodiments, the number of nodes are limited by communications bandwidth to transport the node signals, cost and/or power to operate the nodes.

In some embodiments, designing and processing a phased array may be driven by one or more goals. A first goal may be to produce a specified resolution across the frequency band utilized (e.g., specified to be constant). The resolution of the phased array may be measured by the beam width of the antenna pattern measured at some level (e.g. 3 dB) below the peak of the beam. The resolution at the lowest frequency at broadside (a direction perpendicular to the array) may be constrained by the Rayleigh criteria, which defines the resolution limit by the number of wavelengths in the physical aperture. In some embodiments, for fixed aperture size, at higher frequencies (decreasing wavelength), the resolution increases and the beams narrow. As a result, more beams may need to be used at the highest frequency.

In some embodiments, the broadside beam widths may be fixed at a given frequency f1 (e.g., the lower bound of the frequency range) and the aperture of the phased array may be reduced at frequencies above f1 to preserve a constant resolution and broadside beam width, effectively "trimming the phased array" at higher frequencies to maintain constant resolution across the band. Other applications desire to change the resolution in a specified manner in which case the array is trimmed at each frequency to achieve the central beam threshold using a trimming consistent with the Rayleigh criteria.

In some embodiments, a second goal for receive or imaging phased arrays may be to limit interference from noise, emitters, or reflectors that are outside of a look direction of the phased arrays (e.g., outside of the mainlobe of the beam of radiation). This may allow for higher gain for a phased array operating in directional noise fields, as well as rejection of more intense interfering emitters or reflectors outside the desired look direction and/or limiting transmit interference to users outside the desire look direction. Interference may be envisaged as point interferers, multiple point interferers, sector interferers or multiple sector interferers. Interference may be suppressed by a combination of phased array design and beamforming processing. For example, for each look direction, complex weights may be used in a process similar to adaptive filter design to null anticipated interferers. If the interferers are fixed (e.g. an adjacent cell tower), nulls may be steered. In some embodiments, non-stationary interference may use beam patterns with low sidelobes over selected sectors (Conventional Beamforming (CBF)) or adaptive estimation of the weights based on in situ noise estimates (Adaptive Beamforming (ABF)). In some embodiments, effectiveness of these approaches may be affected if the nodes used at a frequency are wider than half wavelength spacing. In some embodiments, a goal may be used for transmit phased arrays where, for example, the goal is to minimize interference to any receivers or illumination of large reflectors outside of the transmit direction.

FIG. 1 shows a flowchart for a method 100, according to some embodiments. For example, method 100 may be used for generating and processing a phased array that meets design constraints and beam thresholds. In one example, method 100 may be a computer-implemented method that uses iterative routines to optimize antenna design and minimize a node count of a phased array.

In some embodiments, a set of constraints may be supplied to an iterative computer process.

In operation 106, an iterative computer process may generate an initial phased array based on a non-limiting set of constraints, inputs, or thresholds, such as: minimum/maximum frequencies 101, a phased array size 102, a view sector 103, and success criteria 105 that are driven by beam thresholds 104.

In some embodiments, a constraint for the phased array may be to operate in a frequency range 101 (or frequency band) that defined by a lower bound, minimum frequency f0 to an upper bound, maximum frequency f1.

In some embodiments, size 102 of the phased array may be another constraint, typically due to physical limitations on size. In some embodiments, the maximum number of nodes, constrained by processing thresholds, may be computed in an iterative manner.

In some embodiments, view sector 103 over which the phased array is to be used may be another constraint for the phased array. For example, a space based communications antenna design for terrestrial communications may have a view sector that encompasses the planet.

In some embodiments, beam thresholds 104 may specify one or more desired properties for a radiation signal received and/or transmitted by the phased array. As the iterative process alters the initial design of the phased array, the resulting radiation signal associated with the phased array may change. The iterative process may rely on beam thresholds 104 to makes sure the changing radiation signal stays within acceptable performance values. There may be one or more beamformer thresholds. A first goal may be to have a main lobe beam pattern at the central point corresponding to broadside be less than a given value that is consistent with the size of the phased array. Beam widths at angles off the central point may be computed using a reference phased array of uniformly spaced close linear elements of the same size and with shading that provides the central main lobe beam width. In some embodiments, the receive antenna might desire a constant central beam width at each frequency in the frequency range 101.

In some embodiments, a second beamformer goal may be associated with characteristics of the beam pattern. For example, it is often desirable that beam sidelobes are less (e.g., lower intensity) than a specified value at all angles outside the mainlobe of the beam. In some embodiments, for receive phased arrays this supports a given rejection of interfering noise sources outside the mainlobe (or central beam). Those skilled in the art will appreciate that a radiation signal from an antenna may comprise a mainlobe and one or more sidelobes, with the central beam being responsible for conveying information to and/or from the antenna. For transmit phased arrays, this supports reducing the interference on other receivers outside the mainlobe or minimizing reflections from scatterers outside the mainlobe.

In some embodiments, success criteria 105 may also be received. Success criteria 105 may comprise a metric that is associated with how well the beam pattern of a specific phased array meets one or more success criteria. Success criteria 105 may be used to inform the iterative process on how to use beam thresholds 104. In one non-limiting example, success criteria 105 may specify that a beam pattern of radiation that is associated with the phased array should achieve or exceed threshold values specified in beam thresholds 104 for 95% of possible look directions of the phased array. Alternatively, or additionally, success criteria 105 may specify that the beam of radiation achieve a given fraction of the threshold values but for 100% of possible look directions.

In some embodiments, operation 106 may use goals and associated success criteria to generate the number and placement of the nodes in the phased array over the physical size of the phased array, while minimizing the number of the nodes. The process of generating the phased array may be iterative. A starting phased array design may be chosen that meets the thresholds without consideration of node count. This may be a phased array with very dense linearly spaced nodes specified at the upper bound of the frequency range or an analytical expression for the array such as a log array with large node count that meets thresholds throughout the frequency range. The generate array process 106 iteratively reduces the node count (by removing and shifting nodes or changing the parameters of the analytical expression) until the goals are no longer met. This process uses the minimal node count design that meets the goals as the final design. The generated phased array may be used as a basis for beamforming techniques described below.

In some embodiments, operation 108 may be used to achieve desired beam widths over a frequency range, by trimming generated phased arrays at each frequency step to yield an array of size corresponding to approximately the desired number of wavelengths at each frequency of the frequency step. The phased array may then be processed using standard forms of Adaptive Beamforming or Conventional Beamforming. For example, frequency 107 may be used to specify a portion of the phased array for further processing. Values for frequency 107 may be derived from the input frequency range 101. For narrowband systems where f0 is close to f1, frequency may be considered as a single frequency. For broadband systems where f0 and f1 differ substantially, the processing may be iterated using a set of discrete frequency steps, wherein radiation signals of the phased array have been bandpassed by filters or fast Fourier Transforms (FFTs).

In some embodiments, the ABF coefficients may be calculated at operation 111 using the in-situ estimate of the noise field 109 obtained from the node values for each steer angle 110 and according to standard forms of Adaptive Beamforming known to those skilled in the art of phased array processing. ABF coefficients may then be used with the node data to form a beam at operation 112. For example, Adaptive Beamforming can iterate this process at discrete time intervals. In some embodiments, Adaptive Beamforming may use ABF coefficients for adapting to estimates of the local noise field generated from the node data in real time (e.g., at specified time intervals). Alternatively, the phased array may be processed with ABF coefficients fixed over all time to meet goals. In both, a different set of beamforming coefficients may be used at each different steer angle 110 in the view sector 103.

In some embodiments, operation 114 creates a noise field, for example based on beam goals 113.

In some embodiments, operation 115 may be used to generate CBF coefficients using Beamforming. Conventional Beamforming may rely on beam goals 113 to determine the desired beam response. Beam goals 113 may be identical to those of 104 or different. For example, a cellular tower phased array may be designed such that it has uniform sidelobes at the time of manufacture, but later avoid illuminating (and/or interfered with) another cellular tower upon installation at a specific location. In another example, beam goals 113 may reflect expectations of the local noise field. For example, a satellite communications antenna may expect higher noise from manmade sources or higher thermal noise coming from the earth than from deep space. The expected noise field may be used to produce sector nulling in the direction of earth (with an exception being the beam steering sector) with a goal of attaining the largest possible gain against the expected noise field.

In some embodiments, operation 115 generates the CBF coefficients with an adaptive design process that uses a fixed noise field to meet the beam goals 113. The adaptive process is performed with respect to a specified noise field generated during operation 114 for each frequency 107 and steer angle 110.

In some embodiments, the CBF coefficients at each frequency and steer angle may be stored in a database 116, and then used subsequently in the beamforming process at beam forming operation 112. A filter design methodology or an Adaptive Beamforming methodology may be used to generate the coefficients. In some embodiments, a Minimum Variance Distortionless Response (MVDR) Beamformer may be used to generate the coefficients. The coefficients are then used to form the beams.

It should be noted that the CBF methodology may be executed with multiple noise fields that may be selected and used in response to predetermined changes in the noise field. For example, a satellite in a Highly Elliptical Orbit (HEO) may have the earth appear over a wider sector when at lower altitudes. The altitude of the satellite may be used to change CBF coefficients.

Figure 2:
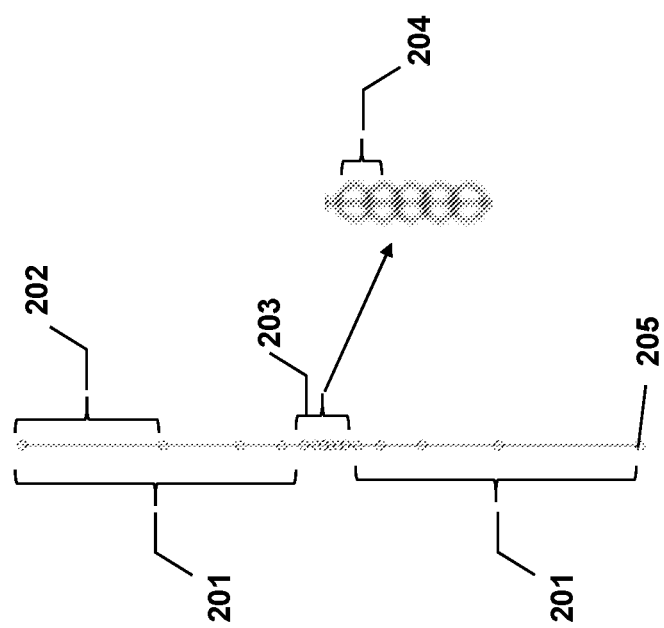
FIG. 2 shows a one dimensional phased array antenna, according to some embodiments.

FIG. 2 shows a phased array 200, according to some embodiments. In some embodiments, phased array 200 may comprise nodes 205 located in first, outer segments 201 and second, central segments 203. In some embodiments, nodes 205 in first segments 201 have spacing 202 and nodes 205 in second segments 203 have spacing 204. In this example, phased array 200 is arranged as a one dimensional line arrangement. Although, it is envisaged that the methods of the present disclosure may be extended to other node arrangements, such as two and three dimensional arrangements of nodes shown in FIG. 6. The one dimensional line arrangement is provided as a non-limiting example and serves to clarify the computer design process.

In some embodiments, the line of nodes of phased array 200 may comprise a set of nodes spaced in a nonlinear manner along a line. Phased array 200 may comprise two or more sections (three sections are shown in FIG. 2 as a non-limiting example). Two sections are segments 201 (e.g., top and bottom segments 201). In some embodiments, only half of the entire array may be used. Segments 201 may comprise a set of nonlinearly spaced nodes that taper with increased separation away from the center of the phased array (i.e., non-constant spacing) up to a widest spacing, spacing 202. Since segment 201 comprises a non-constant arrangement of nodes, it may also be referred to as a non-constant arrangement section or non-linear spacing section.

In some embodiments, phased array 200 may also comprise a central segment 203. Central segment 203 may comprise a set of nodes that are linearly spaced at identical spacing 204 (i.e., constant spacing). By extension, segment 203 may also be referred to as a constant arrangement section or linear spacing section.

In some embodiments, the spacing 202 may be chosen to yield approximate constant broadside beam width and isotopic noise gain against constant direction (isotropic) noise over frequency range 101 (f0 to f1) (discussed in FIG. 1). For example, by the Rayleigh Criteria, the resolution and broadside beam width of phased array 200 are inversely proportional to a length of phased array 200 (the length is measured in wavelengths at the operating frequency). The wavelength may be given by the propagation speed of the medium in the environment c divided by the frequency f. For example, at the lowest frequency f0, the full array length L may be used so that the resolution and beam width are proportional to the number of wavelengths in phased array 200 ($N=L*f0/c$) at that lowest frequency. At any other frequency in the range of f0 to f1, a phased array that has been effectively shortened may be used to maintain an almost constant number of wavelengths in the aperture used. For example, at each frequency f in the range f0 to f1, method 100 may limit the use of nodes of phased array 200 to those that are within a shortened length L', where $L'=L*f0/f$. A center of the trimmed phased array may coincide with a center of phased array 200 of length L. This process may be referred to as trimming the phased array (i.e., operation 108 (FIG. 1)). As the trimming is discrete in number of nodes while frequency is continuous, this serves to provide nearly constant beam width over the frequency range. The extent of segment 203 (where nodes are closest together) may be chosen to approach a length $L1'=L*f0/f1$, which corresponds to the length of a trimmed phased array used at the maximum frequency f1.

In some embodiments, a logarithmic spacing may be chosen for the taper of segments 201, with a goal of maintaining an approximately constant broadside beam width. The logarithmic phased array is a mathematical solution so that at the frequency that corresponds to each of the edge nodes in each trimmed array, a spacing to the next interior node is a constant multiple A of the wavelength at that frequency. Separation 202 between the outermost nodes is given by a multiple of A times the wavelength at f0. A logarithmic solution is an exponential formula involving the length of the phased array in physical units (e.g. meters), the low frequency, the propagations speed of the medium and the edge separation. The logarithmic solution may allow closer frequency spacing for arbitrarily high frequencies as the middle of the phased array is approached. In one example, when the maximum design frequency is f1, the logarithmic taper may be stopped when the frequency of the node (derived from the required constant number of wavelengths over the trimmed array) is larger than f1. The interior spacing 204 may be chosen to be a fraction B (or spacing parameter B) of the wavelength at the highest frequency f1.

Spacing parameter B may be further modified so that the number of nodes in the linearly spaced interior array is an integer. Computations of values for A and B will be discussed in more detail in reference to FIGS. 3 and 4.

In some embodiments, the symmetric nature of the phased array about the center may be optional. For example, one of the top or bottom segments 201 may be omitted from the design, resulting in a so-called half-logarithmic phased array. Some phased arrays may be "fixed" at one end, such as an acoustic towed array wherein the phased array is towed by a ship or submarine from a cable connected at one end. In such phased arrays, larger deformation from a straight line may occur at the end opposite the fixed end due to hydrodynamic forces or turns by the ship or submarine. It is useful to place the highest frequency nodes (most closely spaced) at the fixed end. One segment 201 and half of segment 203 may be utilized. Trimming at frequencies from f0 and above may be accomplished from the most widely spaced end.

In the log array or half log phased array embodiments, positions of the nodes are calculated using spacing values A and B, total length of phased array 200, propagation speed of a radiation signal and frequency range 101 (FIG. 1). In some embodiments, other taper schemes may be used in constructing phased array 200 and there may be more than two spacing parameters to specify the locations of the nodes.

In some embodiments, transmit and/or receive directions (e.g., look directions) of phased array 200 will be described in an angular convention where 0 degrees designates an endfire look direction directly above phased array 200, 90 degrees designates a broadside horizontal look direction perpendicular to the line of phased array 200, and 180 designates the other endfire look direction straight below phased array 200. The convention is non-limiting and provided merely for clarity of discussion. A first design criteria may be that phased array 200 will be used over a given maximum viewing angle V, with V being measured with respect to the broadside horizontal look direction.

Figure 3:
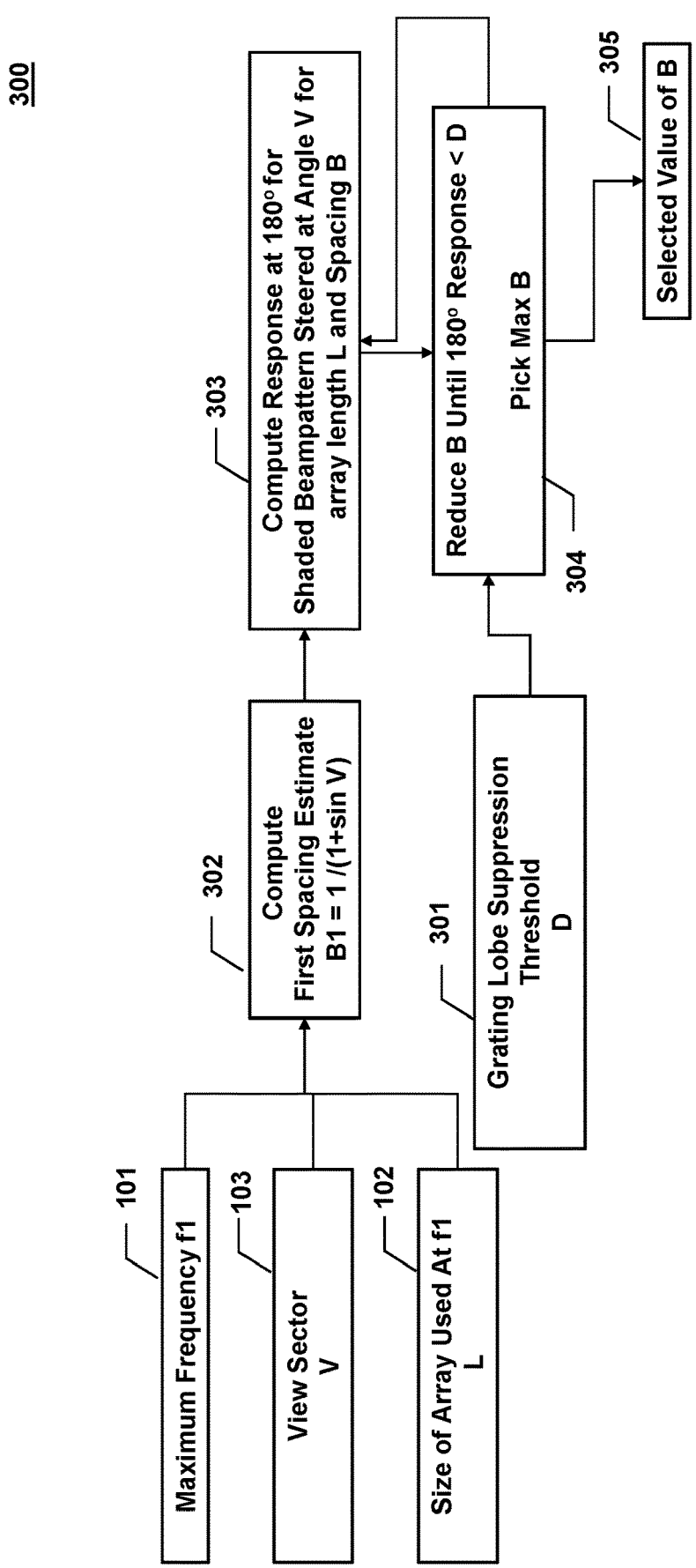
FIGS. 3 and 4 show flowcharts for methods of computing parameters that correspond to spacing between nodes of a phased array antenna, according to some embodiments.
Figure 4:
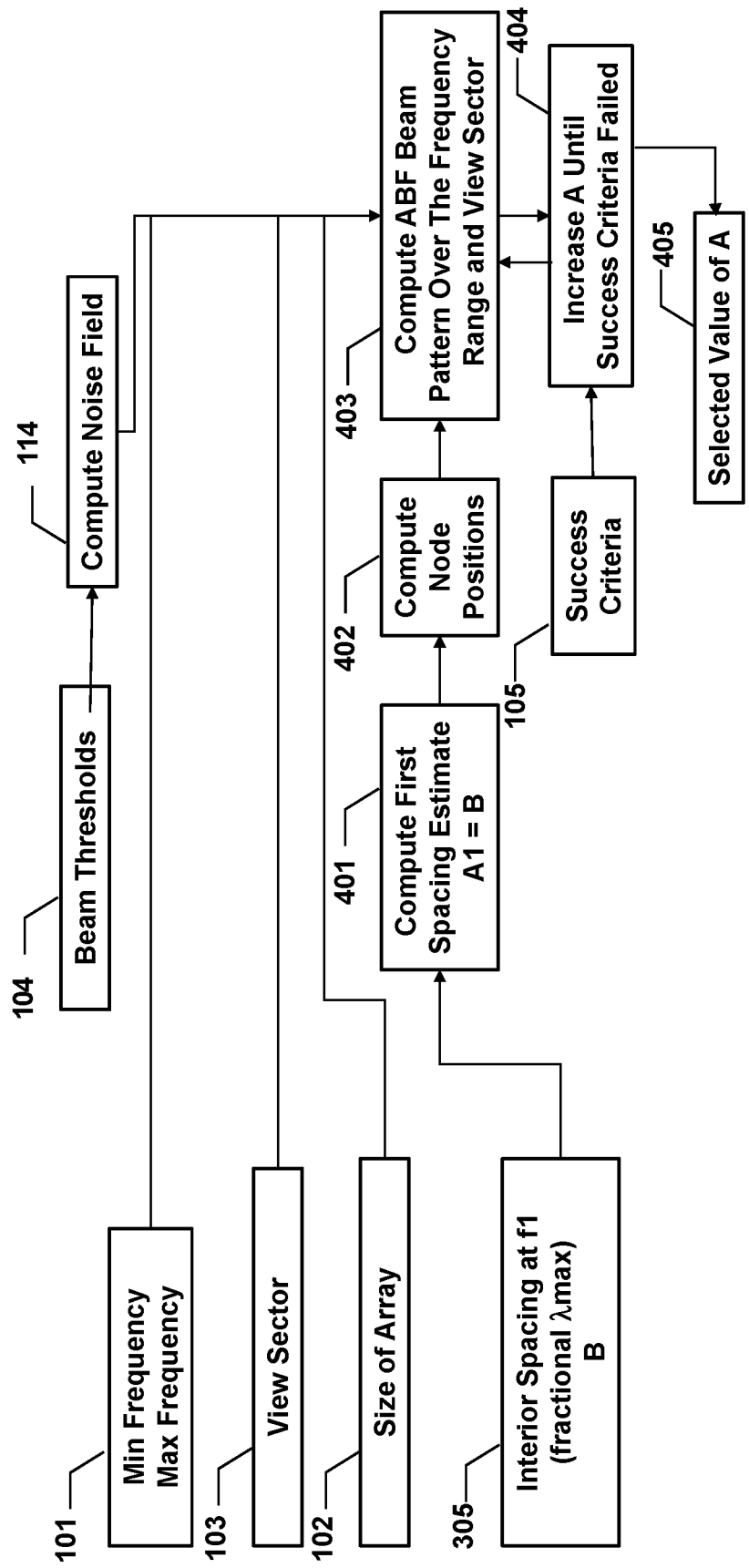

In some embodiments associated with a logarithmic taper, full specification of the number and location of nodes may be achieved using the two spacing parameters A and B. The log array analytical expression uses these two parameters and the constraints of the array length and the frequency range to specify the positions of the nodes of the array. FIGS. 3 and 4 illustrate the process for selecting these two parameters for the analytical log phased array. In some embodiments, one or more parameters may be required for other analytical expressions to generate phased array node positions. In some embodiments, these parameters are determined sequentially as with the log phased array process described in FIGS. 3 and 4. In some embodiments, these parameters are determined at the same time using a multi-dimensional iteration.

FIG. 3 shows a flowchart for a method 300, according to some embodiments. For example, method 300 may be used to determine a spacing between nodes of the interior linear portion 203 of a phased array.

In some embodiments, spacing parameter B may correspond to the value of the node spacing measured in fractional wavelengths at the maximum frequency f1 in the constant arrangement section of the phased array (e.g., segment 203 (FIG. 2)). As the spacing parameter B increases, the number of nodes in the center of the phased array decreases. The linear spacing of the nodes introduces the potential of one or more secondary mainlobes occurring in the beam pattern. The secondary lobes may be referred to as grating lobes. For example, segment 203 (FIG. 2) with spacing of 0.5 wavelengths may have grating lobe directed at 180 degrees that is identical or substantially similar to a mainlobe that is steered at 0 degrees. Grating lobes may be suppressed by placing nodes closer together. The amount of suppression sought may be a design parameter for the phased array, designated as grating lobe suppression goal D at 301.

In some embodiments, during operation 302, a parameter B1 may be estimated based on inputs of, e.g., a maximum frequency f1 (e.g., derived from frequency range 101), a maximum angle V of view off broadside (e.g., derived from view sector 103) and size 102 of the phased array (e.g., a length L of phased array 200 (FIG. 2)). The parameter B1 may represent an initial value of B for which a grating lobe will appear at an endfire direction that is opposite of the angle V. In other words, a phased array that uses the spacing parameter B1 may produce a grating lobe that is identical or substantially similar to the mainlobe that is pointed in the steer direction V. Furthermore, spacing parameter B is a value that may be adjusted by the iterative computer process (e.g., an adjustment value).

In some embodiments, at operation 303, to establish the level of the grating lobe, a shaded beam pattern may be calculated. The shaded beam pattern may be calculated for steering angle V, array length L and the parameter B and the grating lobe intensity level measured.

In some embodiments, at operation 304, the value of B may be iteratively decreased until a magnitude of the grating lobe is reduced to a threshold value of D (grating lobe suppression goal D at operation 301). The value of D can be obtained from the Beam Constraints 104 as the amount of suppression needed near the endfire direction. Having achieved the specified suppression of the grating lobe, the iteratively adjusted spacing parameter B may be optimized and finally selected at operation 305.

In some embodiments, the method 300 may be modified to account for the directivity of directional nodes. Directional transmitters and receivers may be used for nodes of a phased array. For example, RF antenna nodes, optical emitters, vector sensors used in sonar, and the like, may have reduced responses when interacting with signals at directions different from the broadside of the phased array (e.g., a reduced response against a signal that travels along the endfire direction of phased array 200 (FIG. 2)). A dipole node is one non-limiting example of a directional node. For directional nodes, at operation 304, the beam at 180 degrees may be suppressed by the innate response of the directional node. The criteria met at operation 304 (while a grating lobe that is greater than the grating lobe suppression goal D) may occur at an angle less than 180 degrees. Such a modification to method 300 ensures that grating lobes are suppressed for the angular space from 180-V to 180 degrees.

In some embodiments directed to directional nodes, an initial spacing estimate B1 may be computed at operation 302 so that a grating lobe is pointed at the opposite side of the viewing space—that is, 180-V degrees. The iterative process of step 304 may be modified with a set of response angles spaced from 180-V degrees to 180 degrees, verifying that all response angles meet the criteria of having a response less than the grating lobe suppression goal D.

FIG. 4 shows a flowchart for a method 400, according to some embodiments. For example, method 400 may be used for computing a parameter that corresponds to a spacing between nodes of a phased array. In some embodiments, method 400 may be used for choosing the spacing parameter A for a logarithmic taper (e.g., segment 201 (FIG. 2)). Spacing parameter A may also be referred to as an edge value of the logarithmic taper, wherein the edge value can determine the location of the nodes that are to be spaced in a logarithmic manner. Method 400 may be based on receiving frequency range 101, size 102 of the phased array, view sector 103, and beam thresholds 104 for computing noise field 114. Method 400 may also use the value of B selected via method 300 (FIG. 3).

In some embodiments, method 400 optimizes a phased array for meeting thresholds 104 over frequency range 101 and within view sector 103. Success criteria 105 may be used as a metric to evaluate whether the phased array design meets beam thresholds 104. For example, success criteria may specify that for beam patterns beams formed in 403 at each frequency in the frequency range and angle in the view sector, each beam pattern should meet beam thresholds 104 for over 95% of the angles over which each beam pattern in 403 is computed. Success criteria 105 and beam thresholds 104 may define a set of goals to be used in beamforming.

In some embodiments, success criteria may be based on one or more industry standards. For example, communication satellites may have standards for minimum out of beam transmit levels or signal rejection, measured in decibels (dB) for uplink and downlink. In another example, IEEE communication standards may apply to communication towers. Further examples should be apparent to those skilled in the art.

In some embodiments, operation 401 computes a first spacing estimate parameter A1. For example, the usage of A1 may be similar to the usage of B1 in method 300. Initially, the spacing parameter A1 may be set equal to the spacing parameter B as computed and selected by method 300 (FIG. 3). A property of a logarithmic phased array is that node count may decrease as the value of the spacing parameter A increases. Therefore, node count may be minimized by maximizing spacing parameter A.

In some embodiments, operation 402 computes node positions based on first estimate of the spacing parameter A1. In one example, the spacing parameter A is related to the logarithmic spacing scheme (e.g., separation 202 (FIG. 2) between the outermost nodes is given by a multiple of A times the wavelength at f0). Using input noise field 114 based on beam thresholds 104, an Adaptive Beamforming process may be executed at operation 403 to compute the beam pattern at a series of frequencies (e.g., frequency steps, equal steps or otherwise) in frequency range 101 and steering directions (e.g., angular steps, equal steps or otherwise) in view sector 103. The resulting beam patterns are analyzed at operation 404 with respect to the success criteria 105. The value of the spacing parameter A may be iteratively increased if the criteria is/are met. For example, the realized beam patterns computed at each frequency step and angle step in 403 meet the beam thresholds of beam width and sidelobe control specified at over 95% of the angles where those beam patterns are computed in 403. The largest value of the spacing parameter A may be selected at operation 405 based on the iterations arriving at a value of the spacing parameter A that fails to meet the success criteria. A logarithmic phased array design may then be finalized based on the values of the spacing parameter A selected via method 400 and the spacing parameter B via method 300 (FIG. 3).

Figure 5:
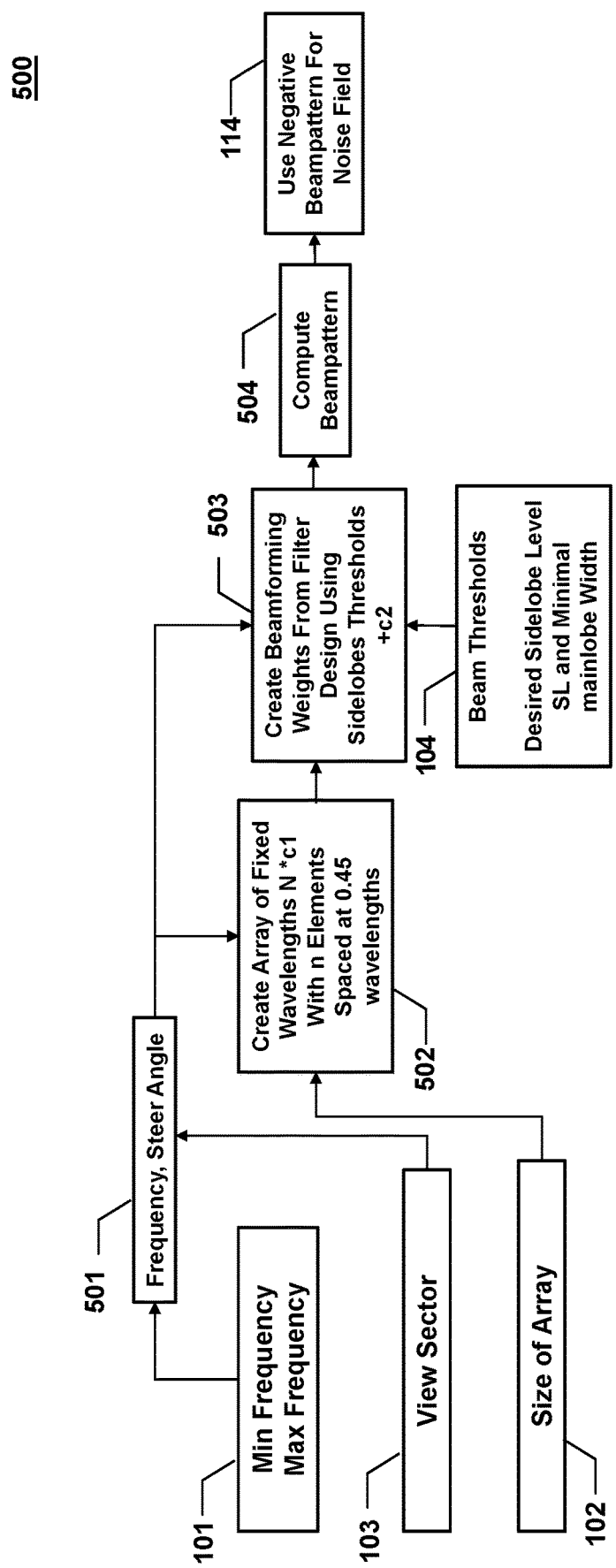
FIG. 5 shows a flowchart for a method of computing a noise field for designing a phased array antenna with minimal beam width and sidelobes below set thresholds, according to some embodiments.

FIG. 5 shows a flowchart for a method 500, according to some embodiments. For example, method 500 may be used for computing noise suppression when designing a phased array antenna to achieve a phased array with minimal mainlobe with sidelobes less than a specified value. It is often desirable to suppress interference away from the look direction (mainlobe direction) and while supporting steer angle dependent beam width thresholds that widen from the central beam width threshold off the array broadside. Interference suppression may be a basis for choosing a Conventional Beamforming shading on a linearly spaced array, such as Dolph-Chebyshev or Taylor shading. An array that meets such goals is sufficient for supporting deeper nulling of point and/or sector interferers using Adaptive Beamforming as was described in reference to 111 (FIG. 1). Method 500 may be used to compute noise field 114 in a manner that will ensure beam thresholds 104 are met over frequency range 101 and view sector 103 for a nonlinear phased array, for example, a log phased array.

In some embodiments, beam thresholds 104 may comprise a threshold value for a mainlobe beam width at broadside to the phased array and a corresponding set of goals off broadside. Beam thresholds 104 may also comprise one or more threshold values for one or more sidelobes (e.g., sidelobe level SL). Beam thresholds 104 may be imposed at each frequency and steering direction during the iterative computer-implemented routine. Discretization of frequency steps (in frequency range 101) and steer angles (in view sector 103) is represented at step 501. The beam width of a mainlobe from a phased array will vary with respect to steer angle. For example, beam width may be minimal at broadside 90 degrees and widen towards endfire 0 and 180 degrees. To accommodate the variation of beam width, noise field 114 may be adjusted so that it too varies with respect to frequency and steer angle by using a reference phased array that meets beam width thresholds and interference rejection/radiation thresholds.

In some embodiments, beam width may be specified at each steer angle by relying on a beam pattern from a linearly spaced shaded phased array of identical length at each frequency having uniformly spaced nodes guaranteeing similar performance for a nonlinearly spaced phased array with fewer nodes compared to the shaded linearly spaced phased array. A noise field may be created by using the negative values of the beam pattern associated with the shaded phased array with uniformly spaced nodes. In this manner, beam broadening towards endfire may be accurately captured. In turn, beam widths may be accurately minimized in view of the shading applied.

In some embodiments, at operation 502 a phased array with uniform node spacing may be generated for each frequency and steer angle—the node spacings being small enough such that grating lobes are suppressed. For each phased array generated in this manner, a length may be a fixed number of wavelengths. In some embodiments, operation 502 can specify a value N by the number of wavelengths in the size of the phased array that is associated with the lowest frequency. Here, N may be slightly reduced by a constant c1 to support flexibility in the ABF process. For example, a typical value of c1 may be 0.95. Values for c1 may be in the range 0.7 to 1.0. Non-limiting examples for ranges of c1 include 0.7 to 0.99, 0.75 to 0.95, and 0.8 to 0.9.

In some embodiments, at operation 503 beamforming may be performed for the phased arrays generated for each frequency and steer angle. The beamforming may be performed with a set of fixed weights using a defined set such as Dolph-Chebyshev or Taylor shading weights computed for the constant node spacing. The shadings may be defined based on threshold value(s) of beam thresholds 104, for example, a desired sidelobe threshold SL. As was done for N above, beam thresholds 104 for a sidelobe may be modified (e.g., SL+c2) to afford some flexibility to the ABF process. For example, c2 may be a 5 dB increase to a sidelobe threshold of 30 dB. At step 504, the resulting beamforming coefficients produced at step 503 may be used to compute the shaded beam pattern of a phased array with uniformly spaced nodes. The resulting shaded beam pattern may be negated so that the low sidelobes of the phased array are now high noise values to be used as noise field 114. Noise field 114 computed at each frequency and angle may be used in method 400 (FIG. 4) to finalize the design of the phased array. Noise field 114 may also be used in the Conventional Beamforming (see e.g., FIG. 1) to generate the CBF coefficients at step 115 for the noise criteria of resulting from method 500.

In some embodiments, certain modifications may be implemented, such as modification to the constant beam width condition and isotropic noise gain condition disclosed in reference to FIGS. 2-5. The modifications may be directed to achieving different gains against noise at higher frequency. As a result, the methods herein may be adapted to a decreasing spectrally colored noise field. One example use case may be in ocean acoustics, where shipping noise may dominate at low frequencies while, at higher frequencies, wind noise may dominate but be substantially lower. Wind noise may also decrease as frequency increases (e.g., 6 dB per frequency doubling). The noise gains at higher frequencies for a given phased array may be less than those at lower frequencies where the noise is higher. This can be instantiated by widening the main lobe width threshold at higher frequencies. These frequency-dependent thresholds result in the number of fixed wavelengths n in operation 502 being frequency-dependent, reduced as frequency increases.

In some embodiments, the sidelobe thresholds may be non-constant over frequency. For example, very good sidelobes may be used in an acoustic array where loud point sources such as surface ships are present, but the decreasing level of those ships at higher frequencies allows relaxation of sidelobe requirements. This will result in the sidelobes SL in operation 503 becoming frequency dependent.

In some embodiments, an alternative strategy to continuously increasing the beam widths at higher frequencies of the phased array may be to nest arrays similar to segment 201 (FIG. 2) to form beams with increased width and decreased isotropic noise gains that are changed stepwise in frequency intervals. The nesting may be performed for each discrete step of frequency. In one example implementation, the number of wavelengths used at each frequency step may be reduced, with lengths of shortened phased arrays L1, L2, . . . Ln-1 corresponding to frequencies f1, f2, . . . fn-1. Methods corresponding to FIGS. 3-5 may be first executed for the entire length of the phased array using frequencies f1 and f2. Exterior nodes of the resulting phased array may be dropped in the normal trimming process until a length of the trimmed phased array is less than L2. Then, another phased array may be generated via the same process, but this time from f2 to f3. This phased array may be used to replace the center of the phased array that was initially generated. The process may be iterated for each additional frequency fi and length Li, where i is a step index. As a result, a phased array generated thusly may have stepwise constant beam width and isotropic noise gain.

In some embodiments, the design of the phased array may be constrained by the maximum number of nodes that can be accommodated, due to limits in communication bandwidth, array cost or array power. In some instances, these constraints may be more dominant than the size constraints previously described so that those size constraints can be relaxed. To accommodate these node count constraints, the processes described herein can be conducted for an initial fixed size phased array to minimize the node count that can support the thresholds for that initial fixed size phased array. The size of the phased array can then be reduced if that node count exceeds the node count constraint or the size of the array can be increased if the node count is smaller than the node count constraint. This process may be repeated until a size that provides a node count equal to the maximum node count is reached.

Figure 6:
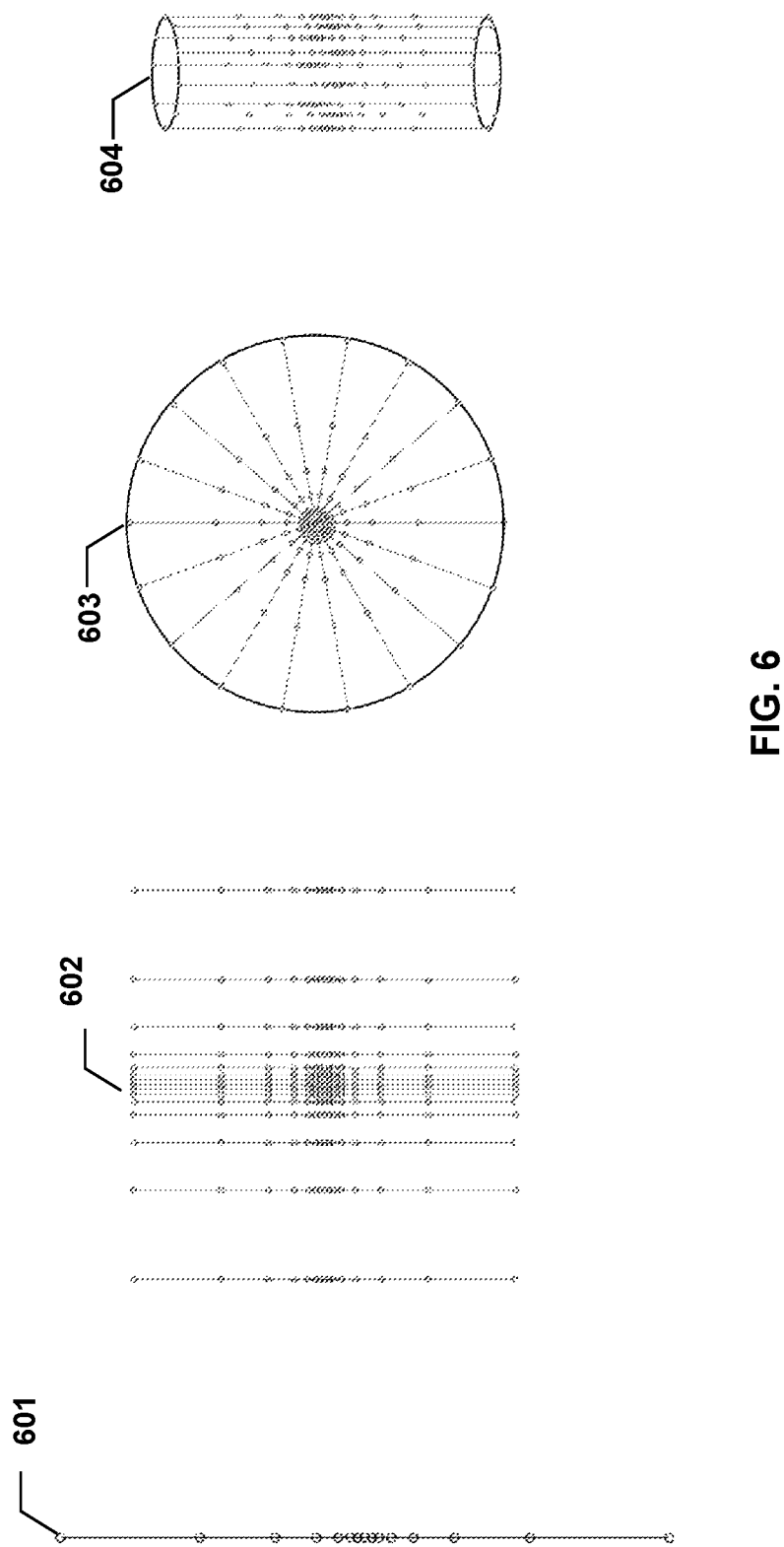
FIG. 6 shows examples of phased array antenna designs, according to some embodiments.

In some embodiments, methods described in reference to FIGS. 4-6 may be extended to node arrangements of dimensions higher than one (e.g., two and three dimensions). The line arrangement of nodes of phased array 200 (FIG. 2) may be referred to as one dimensional (nodes disposed on a straight line). In general, methods described herein may be used to design phased arrays having nodes distributed throughout a plane or volume.

In embodiments of multidimensional arrays, the constraints and thresholds are extended into multiple dimensions. Size constraints in 102 (FIG. 1) may be different for each of the dimensions. The view sector constraints of 103 (FIG. 1) may be different for the two angles of physical space, for example bearing and elevation. The beamformer may operate over these two angles to both steer in a specified direction and reject interference or suppress transmission in other directions. The beamforming thresholds for a phased array may contain beam width thresholds in two dimensions and the iterative process described in FIGS. 3-5 may use a two dimensional grid of angles in the viewing sector to set constraints for the iterative process as a direct extension of the one dimensional array process. Interference rejection or transmission suppression beamforming thresholds are also now two dimensional.

In some embodiments, the operations described herein for designing phased arrays with minimized node count may rely on meeting beam thresholds. Meeting the beam thresholds are evaluated for a set of node positions at a set of frequency and steer angle points within the frequency band and view sector by constructing noise fields that correspond to the beam widths of a reference array that has a central beam width equal to the threshold central beam of the radiation signal and have reduced noise outside this central beam equal to the threshold for interference associated with radiation outside of the central beam, selecting beamforming coefficients for the set of node positions that form a maximize the performance of the beamformed array in that noise field, creating the beam pattern that corresponds to those coefficients, evaluating the percentage of the beam pattern that is less than the desired noise field with a small or zero perturbation, and ensuring that percentage is above a desired percentage for each frequency and steer point. An analytical expression is used containing one or more parameters to specify the locations of the nodes wherein the adjustment consists of altering those parameters in a method to reduce the node count. a computer algorithm is used to specify the locations of the nodes wherein the adjustment consists of changing the positions of some nodes to eliminate nodes to reduce the overall node count. Iterating computer processes may include iteratively increasing the logarithmic node-to-node spacing, with each iteration evaluated by the ability to form a beam pattern with beam response over the view sector and frequency range to substantially meet those thresholds at the angle of each beam pattern. Characterizing of the noise comprises determining a noise field according uses a linearly spaced array of equal length at each frequency to generate a noise field at sampled frequencies in the frequency range and sampled angles in the view sector. Alternatively, a maximum node count may be specified, where the size is iterated to determine a computer derived minimum node count for each size until a size is reached that matches the maximum node count constraint. In this manner, a final set of locations of the nodes can be determined to minimize the node count, wherein node count minimization is based on the specified maximum while the algorithm makes adjustments to achieve the final set of locations that optimizes operation of the antenna.

FIG. 6 shows examples of different phased arrays, according to some embodiments. In some embodiments, the design thresholds for these phased arrays may be as described above in reference to FIGS. 1-5, but now extended by the increased dimensionality of the phased arrays.

In some embodiments, phased array 601 is a one dimensional phased array that is similar to phased array 200 (FIG. 2). Phased array 602 is a two dimensional phased array having nodes distributed across a plane.

In some embodiments, phased array 602 may comprise a plurality of one dimensional phased arrays (e.g., copies of phased array 601). The plurality of one dimensional phased arrays may have an inter-line spacing that is identical to or substantially similar to the logarithmic spacing of phased array 200 (FIG. 2)—that is, having a constant spacing near the center and/or a logarithmic taper away from the center.

In some embodiments, phased array 603 may be a two dimensional phased array. In contrast with phased array 602, phased array 603 may have radial symmetry (e.g., having node dispositions following circles or ellipses). Nodes toward the center may have constant spacing. Nodes away from the center may have a spacing corresponding to a logarithmic taper.

In some embodiments, phased array 604 may be a three dimensional phased array. phased array 604 may comprise a plurality of one dimensional phased arrays (e.g., copies of phased array 601). The plurality of one dimensional phased arrays may be arranged such that the lines of the one dimensional phased array outline a cylinder—in other words, have a cross section at which nodes are disposed in a circular or elliptical manner. In some embodiments, the cross section arrangement may have a two dimensional arrangement similar to those of phased array 602 or 603.

In some embodiments, additional parameters may be introduced as multi-dimensional extensions of spacing parameters A and B. The additional parameters may be optimized in a manner similar to the optimization of spacing parameters A and B. In one example, selection of spacing parameter B (operation 305 (FIG. 3)) may be replaced with a vector of the appropriate dimension for an n-dimensional phase array. The view sector 103 may span three dimensional space. Noise field 114 may be three dimensional. Iterative computer processes described herein may be performed over the parameter vector space with the criteria being geared to seek the fewest nodes for meeting the performance thresholds.

In some embodiments, a second pass at node reduction may be made on the vector parameter. For example, in array 602, the entire phased array may be utilized at the lowest frequencies to achieve the entire two dimensional beam width thresholds. However, the corner and near corner nodes may be approximated as not contributing appreciably to beam performance. Hence, the corner and/or near corner nodes may be removed by trimming the outside vertical staves (i.e., the vertical lines) of the phased array. Another optimization may be achieved by considering the top center nodes, which may be horizontally spaced much closer than needed for the lowest frequency of the phased array that utilizes the entire array. Their close spacing may have limited applicability, for example, applicable to the highest frequencies that primarily utilize the center of the phased array. Hence, a second additional trimming pass may be made to alter the length of some of the interior staves near the horizontal center of the phased array. The amount of trimming may be achieved by parameterizing a length of each stave and using the multi-dimensional variants of the iterative computer processes described herein.

In some embodiments, a similar process may be used for the circular arrangement of phased array 603. Here, the nodes toward the center may be unnecessarily dense. For example, each line array forming two contiguous spokes may have a node in the center of the phased array, where just one may suffice. Here, the line phased arrays may be trimmed by removing segments in the center of the phased array.

In some embodiments, the phased arrays may be constructed without relying on copies of a one dimensional phased array. For example, the multi-dimensional phased array may be specified by a set of parameters as well as constraints of desired size and frequency band, and beam thresholds now specified for each of the dimensions. Methods described herein may be used to optimize the set of parameters.

In some embodiments, a purely numerical method may be used to define the node number and the placement of the nodes, as an alternative to the selection of parameters that are prescribed by an analytical expression such as the log phased array described above. Example methods may include genetic algorithms or more recent approaches such as machine learning. These approaches postulate specific numbers of nodes and placement and may be worked into the methods disclosed herein by replacing the computation of specific values in 401 (FIG. 4) and the computation of node positions in 402 (FIG. 4) with the computer algorithm, using the success criteria 105 (FIG. 1) and utilization of an adaptive method 404 (FIG. 4) to provide a metric for the numerical algorithms to use in their iterations.

In some embodiments, the numerical algorithms may select the beamforming coefficients in step 403 (FIG. 4), but the resulting success criteria 105 may still be utilized over the frequency range and view sector to meet the success criteria. When applied to a beam threshold of matching a specified beam pattern, the creation of the noise field as described herein may also be used in conjunction with numerical algorithms. Referring to FIG. 1, once these algorithms have generated the phased array in 106, the subsequent processing of the phased array for either Adaptive or Conventional Beamforming may proceed as outlined in that disclosure.

The methods described herein for designing phased arrays may be described in different words. For example, in some embodiments, a method to design a phased array antenna may comprise determining a first set of locations of nodes based on a set of constraints and thresholds. Then, a final set of locations of the nodes may be determined based on iterative adjustments to the locations of the nodes in order to minimize the node count. An optimized operation of the phased array antenna is achieved with the final set of locations of the nodes. The term "optimized" may be used to refer to a phased array antenna having a minimum node count for achieving specified success criteria.

In some embodiments, the determining of the first set of locations may comprise determining a resolution and beam width of the central beam that is approximately proportional to a number of wavelengths at a lower bound of the frequency range that fit within the size of the antenna. Additionally, or alternatively, the determining of the first set of locations may comprise determining a resolution and beam width of the central beam that is approximately proportional to a number of wavelengths at an upper bound of the frequency range that fit within a reduced size of the antenna (e.g., trimming the phased array). The reduced size may be approximately the size of the antenna multiplied by a lower bound of the frequency range and divided by the upper bound of the frequency range.

In some embodiments, the determining of the first set of locations may comprise determining that beams formed using the first set of locations do not meet the set of thresholds for a wavelength corresponding to a frequency in the frequency range that fits within a reduced size of the antenna. The reduced size may be approximately the size of the antenna multiplied by a lower bound of the frequency range and divided by the frequency in the frequency range. The determining of the first set of locations may further comprise adding additional nodes in the reduced size of the antenna such that beams formed using the additional nodes meet the set of thresholds.

In some embodiments, the method may comprise iterating the determining of the adjustment value until a minimum number of the nodes and node locations are determined for one or more threshold parameters of the antenna. For example, the spacing parameters A and B may be computed via iterative computation described for methods 300 (FIG. 3) and 400 (FIG. 4). Adjusting the spacing parameters A and B is one example of determining adjustment values for node locations that result in a minimized node count for the phased array.

Systems and processes disclosed herein allow the implementation of phased arrays with significantly reduced node count that support specified beam width and sidelobe control operations over broad frequency bandwidths. Spatial point and sector interference outside the steer direction may be suppressed if desired. One or more embodiments herein may be used to reduce node count for arrays based on viewing sector (e.g., throughout the full 360 degree field of view or in a limited angular sector). Embodiments disclosed herein may use adaptive beamforming in the phased array design process to meet design constraints and thresholds, while minimizing the number of nodes in the phased array employed. Embodiments disclosed herein may use beam steering coefficients that can be dynamically updated using Adaptive Beam Forming. Embodiments disclosed herein may be used to develop fixed beam steering coefficients for use with Conventional Beamforming. The present disclosure is applicable to at least linear arrays of nodes, planar arrays, and three dimensional arrays created from a set of linear or planar arrays. Embodiments disclosed herein may be used with nodes that have omni-directional equal response or directional patterns, such as dipole nodes.

Embodiments disclosed herein may significantly reducing the node count in a phased array. A node count reduction comparison may be illustrated by considering a set of cases for a linear one dimensional array that has a length equivalent to 30 wavelengths at the lowest frequency f0 that is to be used over a view sector from 0 to 180 degrees. The design thresholds for this array may be to have a constant central main beam width corresponding to a shaded linear array of the same length, and sidelobes more than 30 dB below the mainlobe. In the current state of the art, a HF Dense approach may be used. Nodes are placed at constant spacing of 0.48 wavelengths at the highest frequency. An alternative approach is a Peak Gain (against direction independent isotropic noise) nested array, where at the constant wavelength lengths corresponding to every frequency doubling starting at f0, a set of nodes are placed midway between the existing nodes to form a nest with peak isotropic noise gain and beam width matching the lowest frequency. Gain decreases and beam widths widen above these nest frequencies until the next nest frequency is reached. Yet another alternative approach is a so-called All Gain Nested Array, which ensures that all isotropic noise gains exceed the gain at the lowest frequency and the beam widths are narrow. Further still, a so-called Traditional Log Spaced approach uses logarithmic spacing with a linear interior segment, but the edge nodes are spaced at 0.5 wavelengths at the low frequency and the center spaced at 0.5 wavelengths at the highest frequency.

For an array that is used from frequency f0 to frequency f1=16*f0, the HF Dense array uses 993 nodes, the Peak Gain Nested Array uses 190 nodes, the All Gain Nested Array uses 316 nodes, the Traditional Log Array uses 225 nodes. In contrast, embodiments disclosed herein may significantly reduce the total node count to 145 nodes. For an array that is used from f0 to f1=4*f0, the HF Dense array uses 249 nodes, the Peak Gain Nested Array uses 127 nodes, the All Gain Nested Array uses 190 nodes, the Traditional Log Array uses 143 nodes. In contrast, embodiments disclosed herein may significantly reduce the total node count to 98 nodes. For a narrowband array that is used from f0 to f1=1.2*f0, the HF Dense array uses 77 nodes, the Peak Gain Nested Array uses 77 nodes, the All Gain Nested Array uses 77 nodes, the Traditional Log Array uses 75 nodes. In contrast, embodiments disclosed herein may significantly reduce the total node count to 61 nodes. As cost, power, and computational complexity scale with node count, embodiments of the present disclosure provide significant reductions and savings compared to the current state of the art approaches. The reductions in node counts multiply for arrays that have more than one dimension.

Figure 7:
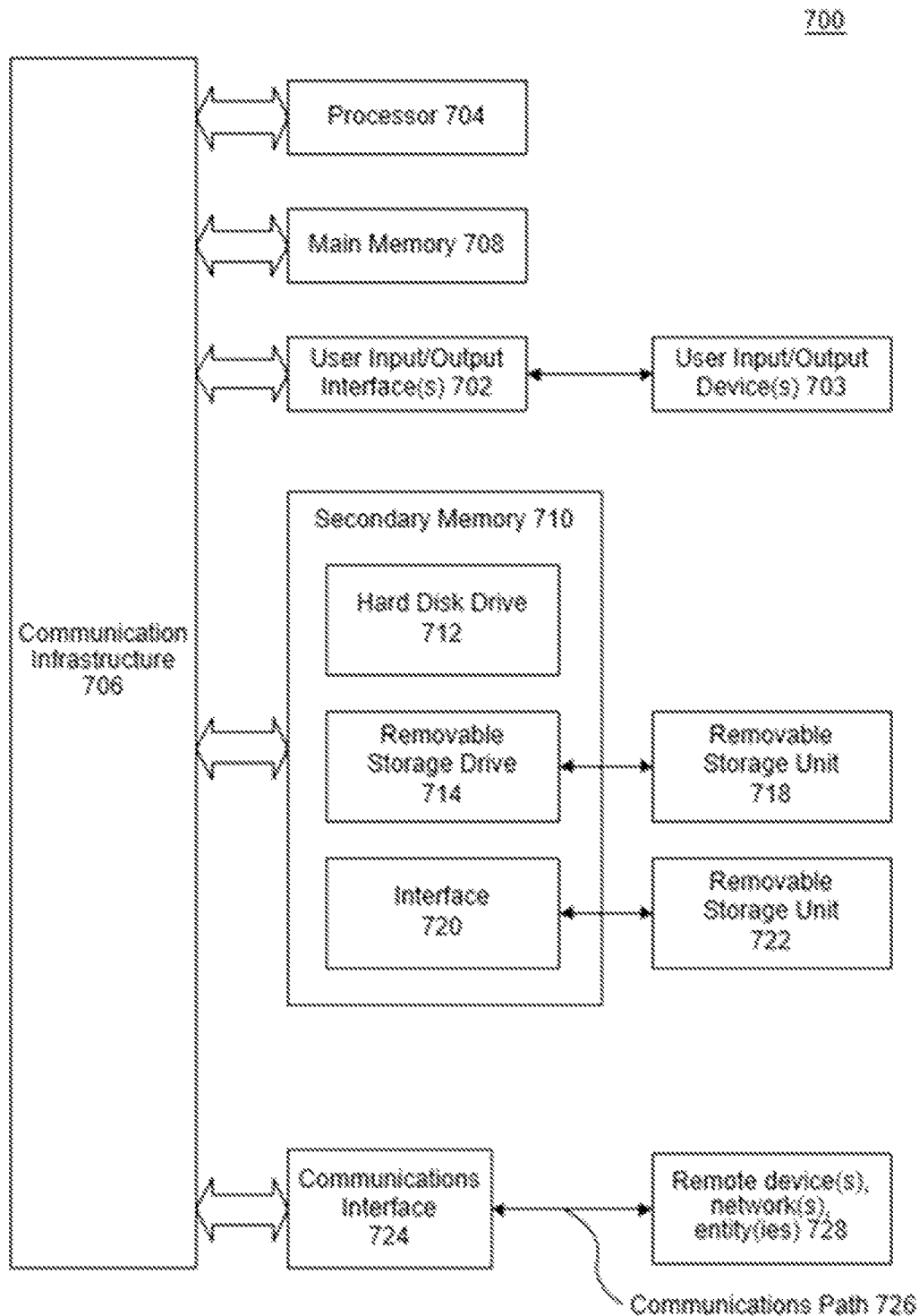
FIG. 7 shows a computer system for implementing various embodiments of this disclosure.

FIG. 7 shows a computer system 700, according to some embodiments. Various embodiments and components therein can be implemented, for example, using computer system 700 or any other well-known computer systems. For example, the method steps of FIGS. 1 and 3-5 may be implemented via computer system 700.

In some embodiments, computer system 700 may comprise one or more processors (also called central processing units, or CPUs), such as a processor 704. Processor 704 may be connected to a communication infrastructure or bus 706.

In some embodiments, one or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

In some embodiments, computer system 700 may further comprise user input/output device(s) 703, such as monitors, keyboards, pointing devices, etc., that communicate with communication infrastructure 706 through user input/output interface(s) 702. Computer system 700 may further comprise a main or primary memory 708, such as random access memory (RAM). Main memory 708 may comprise one or more levels of cache. Main memory 708 has stored therein control logic (i.e., computer software) and/or data.

In some embodiments, computer system 700 may further comprise one or more secondary storage devices or memory 710. Secondary memory 710 may comprise, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive. Removable storage drive 714 may interact with a removable storage unit 718. Removable storage unit 718 may comprise a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

In some embodiments, secondary memory 710 may comprise other means, instrumentalities or other approaches for allowing computer programs and/or other instructions and/or data to be accessed by computer system 700. Such means, instrumentalities or other approaches may comprise, for example, a removable storage unit 722 and an interface 720. Examples of the removable storage unit 722 and the interface 720 may comprise a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some embodiments, computer system 700 may further comprise a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may comprise any combination of LANs, WANs, the Internet, etc. Control logic and/or data may be transmitted to and from computer system 700 via communications path 726.

In some embodiments, a non-transitory, tangible apparatus or article of manufacture comprising a non-transitory, tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to those skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be understood that the phraseology or terminology herein is for the purpose of description and not of limitation, such that the terminology or phraseology of the present disclosure is to be interpreted by those skilled in relevant art(s) in light of the teachings herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While specific embodiments of the disclosure have been described above, it will be appreciated that embodiments of the present disclosure may be practiced otherwise than as described. The descriptions are intended to be illustrative, not limiting. Thus it will be apparent to one skilled in the art that modifications may be made to the disclosure as described without departing from the scope of the claims set out below.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of the protected subject matter should not be limited by any of the above-described exemplary embodiments, but should be defined only in accordance with the following claims and their equivalents.

What is claimed is:

1. A computer-implemented method to minimize a node count for a design of a phased array of an antenna, comprising:
   determining a first set of locations of nodes of the phased array, for the design of the phased array, based on a set of constraints for the antenna and based on a set of thresholds corresponding to a performance of the antenna, wherein:
      the antenna comprises the nodes of the phased array for receiving, transmitting, or receiving and transmitting a radiation signal,
      the set of constraints comprises a shape and size of the antenna, a frequency range for the radiation signal, and a view sector, and
      the set of thresholds comprises:
         a threshold for a beam width of a central beam of the radiation signal; and
         a threshold for interference associated with radiation outside of the central beam of the radiation signal;
   determining an adjustment for the first set of locations in accordance with the set of thresholds, wherein the adjustment comprises:
      determining a constant node-to-node spacing of a portion of the nodes; and
      determining an edge value used for a logarithmic node-to-node spacing of a remaining portion of the nodes, wherein an initial value of the edge value is determined as a function of the constant node-to-node spacing; and
   determining a final set of locations of the nodes for the design of the phased array based on the adjustment to minimize the node count, whereby an optimized operation of the antenna is achieved with the final set of locations of the nodes, wherein the final set of locations of the nodes comprises the constant node-to-node spacing of the portion of the nodes and the logarithmic node-to-node spacing of the remaining portion of the nodes.

2. The computer-implemented method of claim 1, wherein:
the determining of the first set of locations comprises determining that beams formed using the first set of locations meet the set of thresholds for a wavelength at an upper bound of the frequency range that fits within a reduced size of the antenna; and
the reduced size is approximately the size of the antenna multiplied by a lower bound of the frequency range and divided by the upper bound of the frequency range.

3. The computer-implemented method of claim 1, wherein:
the determining of the first set of locations comprises determining that beams formed using the first set of locations meet the set of thresholds for a wavelength corresponding to a frequency in the frequency range that fits within a reduced size of the antenna; and
the reduced size is approximately the size of the antenna multiplied by a lower bound of the frequency range and divided by the frequency in the frequency range.

4. The computer-implemented method of claim 1, wherein:
the determining of the first set of locations comprises determining that beams formed using the first set of locations do not meet the set of thresholds for a wavelength corresponding to a frequency in the frequency range that fits within a reduced size of the antenna;
the reduced size is approximately the size of the antenna multiplied by a lower bound of the frequency range and divided by the frequency in the frequency range; and
the determining of the first set of locations further comprises adding additional nodes in the reduced size of the antenna such that beams formed using the additional nodes meet the set of thresholds.

5. The computer-implemented method of claim 1, further comprising iterating the determining of the adjustment until a minimum number of the nodes and node locations are determined for the set of thresholds.

6. The computer-implemented method of claim 5, wherein the iterating is performed a number of times according to a number associated with a discretization of the frequency range, the view sector, or the frequency range and the view sector.

7. The computer-implemented method of claim 5, wherein the determining of the adjustment comprises:
performing beamforming for the phased array according to the adjustment, wherein the adjustment is associated with a node-to-node spacing and number of the nodes; and
determining whether at least one value of one or more properties of a beam of radiation generated by the beamforming crosses one or more values of the set of thresholds.

8. The computer-implemented method of claim 7, further comprising terminating the iterating based on at least one value of the one or more properties of a beam of radiation crossing the one or more values of the set of thresholds.

9. The computer-implemented method of claim 8, wherein:
the determining of the adjustment further comprises selecting the edge value according to the set of thresholds.

10. The computer-implemented method of claim 9, wherein:
the iterating comprises iteratively increasing the edge value; and
each iteration is evaluated with respect to forming a beam pattern with beam response over the view sector and the frequency range according to the set of thresholds.

11. The computer-implemented method of claim 7, wherein:
the determining of the adjustment further comprises selecting the constant node-to-node spacing based on generating a secondary lobe of radiation at an endfire direction of the phased array.

12. The computer-implemented method of claim 11, wherein the iterating comprises iteratively reducing the constant node-to-node spacing such that a magnitude of the secondary lobe is reduced according to the set of thresholds.

13. The computer-implemented method of claim 1, further comprising characterizing noise for the phased array, wherein the determining of the adjustment is based on the characterizing of the noise.

14. The computer-implemented method of claim 13, wherein the characterizing of the noise comprises determining a noise field using a linearly spaced array of equal length at each frequency to generate a noise field at sampled frequencies in the frequency range and sampled angles in the view sector.

15. The computer-implemented method of claim 13, wherein the characterizing of the noise comprises determining a negative of shaded beam patterns associated with a plurality of simulated phased arrays generated based on the set of constraints and the set of thresholds.

16. The computer-implemented method of claim 13, further comprising removing one or more nodes based on frequency dependent noise.

17. The computer-implemented method of claim 1, wherein:
the determining of the final set of locations comprises determining a two dimensional arrangement for the nodes; or
the determining of the final set of locations comprises determining a three dimensional arrangement for the nodes.

18. The computer-implemented method of claim 1, wherein the frequency range comprises acoustic frequencies, radio frequencies, satellite frequencies, or optical frequencies.

* * * * *